United States Patent [19]
Wong et al.

[11] Patent Number: 6,078,335
[45] Date of Patent: Jun. 20, 2000

[54] METHOD AND APPARATUS FOR DETERMINING LEVEL OF DETAIL FOR TEXTURE FILTERING

[75] Inventors: Daniel Wong, North York; Milivoje Aleksic, Richmond Hill, both of Canada

[73] Assignee: ATI Technologies, Inc., Thornhill, Canada

[21] Appl. No.: 09/088,083

[22] Filed: Jun. 1, 1998

[51] Int. Cl.[7] .......................... G06T 15/00; G06T 11/40
[52] U.S. Cl. ............................................. 345/430
[58] Field of Search .................. 345/428, 429, 345/430, 425, 439, 441

[56] References Cited

U.S. PATENT DOCUMENTS

| | | | |
|---|---|---|---|
| 5,649,078 | 7/1997 | Gerth | 345/422 |
| 5,831,624 | 11/1998 | Tarolli et al. | 345/430 |
| 5,870,097 | 2/1999 | Snyder | 345/426 |
| 5,870,102 | 2/1999 | Tarolli | 345/430 |
| 5,886,701 | 3/1999 | Chauvin | 345/418 |
| 5,945,997 | 8/1999 | Zhao | 345/429 |
| 5,949,426 | 9/1999 | Rich | 345/429 |
| 5,953,015 | 9/1999 | Choi | 345/430 |
| 5,977,977 | 11/1999 | Kajiya | 345/418 |
| 6,005,582 | 12/1999 | Gabriel | 345/430 |
| 6,005,584 | 12/1999 | Kitamura | 345/429 |
| 6,009,345 | 12/1999 | Taubin | 345/423 |

*Primary Examiner*—Mark R. Powell
*Assistant Examiner*—Wesner Sajous
*Attorney, Agent, or Firm*—Markison & Reckamp

[57] ABSTRACT

A method and apparatus for determining the level of detail for texture mapping applications in video graphic circuits begins by updating first and second linear components of a set of derivatives when rendering a pixel of an object in a given scan line. The first and second linear components are updated in a linear manner based on first and second increment values, respectively. The set of derivatives corresponds the changes of the texture coordinates with the changes of the physical coordinates of an object being rendered, the derivatives include $\delta s/\delta x$, $\delta t/\delta x$, $\delta s/\delta y$, and $\delta t/\delta y$—in general, the set of derivatives equals $\delta a/\delta b = w^2 * ((1/w)*(\delta(a/w)/\delta b) - (a/w)*(\delta(1/w)/\delta b))$. When the object is being rendered on a new scan line, third and fourth linear components are updated in a linear manner based on third and fourth increment values, respectively. As the linear components are updated, their magnitudes are compared, and the one having the greatest magnitude is selected. The selected magnitude is then converted into a logarithmic scale to produce a logarithmic magnitude. The logarithmic magnitude of the linear component is then combined with a logarithmic representation of a non-linear component of a set of derivatives to obtain the level of detail for a given pixel.

29 Claims, 5 Drawing Sheets

METHOD AND APPARATUS FOR DETERMINING LEVEL OF DETAIL FOR TEXTURE FILTERING

TECHNICAL FIELD OF THE INVENTION

This invention relates generally to video graphics circuitry and more particularly to texture mapping.

BACKGROUND OF THE INVENTION

As is known, video graphic circuitry is used in computer systems. Such video graphic circuitry functions as a co-processor to the central processing unit of the computer, wherein the video graphics circuitry processes graphical functions such as drawings, paintings, video games, etc. to produce data for display.

In a simple two-dimensional display, the video graphics circuitry receives graphical data and commands from the central processing unit and executes the commands upon the graphical data to render the two-dimensional image. Such two-dimensional images may be generated while the central processing unit is performing two-dimensional applications, such as word processing, drawing packages, presentation applications, spreadsheet applications, etc.

Video graphics circuitry is also capable of rendering three-dimensional images. To render three-dimensional images, the central processing unit provides the video graphics circuitry with commands and graphics data. The commands indicate how the video graphics circuitry is to process the graphics data to produce render three-dimensional images for subsequent display. The graphics data and/or commands may include color information, physical coordinates of object elements being rendered, texture coordinates of the object elements, alpha-blending parameters, etc. The texture coordinates are utilized to map a texture onto a particular object element as it is rendered in the physical space of the display.

When a three-dimensional image is being rendered as a perspective view, i.e., having a portion of the image appear closer and another portion of the image appear further away, MIP mapping is utilized. MIP mapping provides a plurality of texture maps wherein the first texture map is an uncompressed texture map. A second texture map of the plurality of texture maps is a four-to-one compressed texture map, where the length and width of the first texture map are each compressed by a factor of 2. The third texture map is a sixteen-to-one compressed representation of the uncompressed texture map. The plurality of texture map continues dividing the length and width of the first texture map by $2^N$ until the compressed texture map has been compressed to a single texel.

When rendering perspective objects, the rendering circuitry of the video graphics circuit accesses one of the plurality of MIP maps based on a level of detail to retrieve the appropriate texel(s) for the current pixel being rendered. As the closer portions of the perspective objects are being rendered, the level of detail identifies the less compressed MIP maps (e.g., the uncompressed texture map, the four-to-one texture map, the sixteen-to-one texture map). When the further away portions of the perspective objects are being rendered, the level of detail indicates the more compressed MIP maps (e.g., sixteen-to-one texture map, thirty-two-to-one texture map, etc.).

Once the level of detail has been determined and a MIP map has been accessed, a set of texels is retrieved. The set of texels may be retrieved from a single MIP map which are bilinear filtered to obtain the desired texel. Alternatively, two MIP maps may be accessed to retrieve a set of texels which are trilinearly filtered to obtain the desired texel. As such, a set of texels may be filtered either by a bilinear filtering process or a trilinear filtering process.

The level of detail may be obtained by the equation $\delta a/\delta b=(1/w)*(\delta(a/w)/\delta b-a(\delta(1/w)/\delta b))$, where a equals texture coordinates in the set of {s,t} and b equals physical coordinates in the set of {x, y}. The w value is the texture scaling factor. As can be seen, this equation is a non-linear equation and requires several multiplication functions to be performed. As such, it is a rather expensive equation to implement in silicon due to the multiplication functions and the non-linearities. Thus, making it cost prohibitive implementation for commercial grade video graphic circuits.

Therefore, a need exists for a method and apparatus of determining the level of detail for texture mapping and further allows for dynamic utilization of bilinear filtering and/or tri-linear filtering.

DETAILED DESCRIPTION OF A PREFERRED EMBODIMENT

In general, the present invention provides a method and apparatus for determining the level of detail for texture mapping applications in video graphic circuits. Such processing begins by updating first and second linear components of a set of derivatives when rendering a pixel of an object in a given scan line. The first and second linear components are updated in a linear manner based on first and second increment values, respectively. The set of derivatives corresponds the changes of the texture coordinates with the changes of the physical coordinates of an object being rendered, the derivatives include $\delta s/\delta x$, $\delta t/\delta x$, $\delta s/\delta y$, and $\delta t/\delta y$ [in general, the set of derivatives equals $\delta a/\delta b=w^2*((1/w)*(\delta(a/w)/\delta b)-(a/w)*(\delta(1/w)/\delta b))$]. When the object is being rendered on a new scan line, third and fourth linear components are updated in a linear manner based on third and fourth increment values, respectively. As the linear components are updated, their magnitudes are compared, and the one having the greatest magnitude is selected. The selected magnitude is then converted into a logarithmic scale to produce a logarithmic magnitude. The logarithmic magnitude of the linear component is then combined with a logarithmic representation of a non-linear component of a set of derivatives to obtain the level of detail for a given pixel. With such a method and apparatus, the level of detail may be obtained by performing linear functions and simple additions and/or subtractions. As such, the non-linear functions multiplications of previous embodiments are not needed to determine the level of detail. As such, the complexity of level of detail circuitry is reduced, which, in turn, reduces the cost thereby making it readily usable for commercial grade video graphic circuits.

Figure 1:
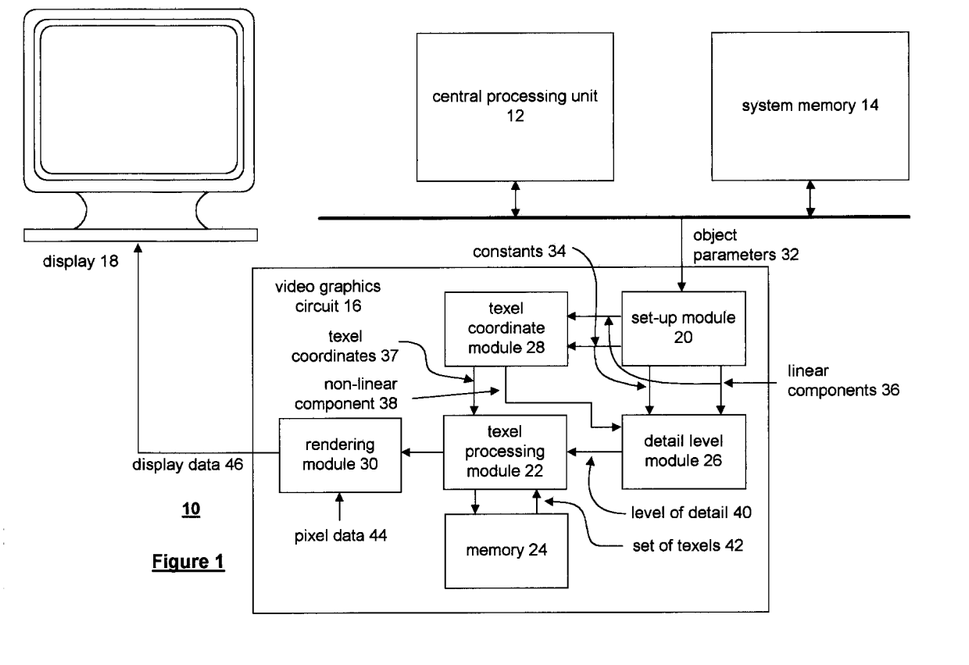
FIG. 1 illustrates a schematic block diagram of a computing system in accordance with the present invention.

The present invention can be more fully described with reference to FIGS. 1 through 7. FIG. 1 illustrates a schematic block diagram of a computer system 10 that includes a central processing unit 12, system memory 14, a video graphics circuit 16, and a display 18. The central processing unit 12 may be any central processing unit found in a personal computer, laptop computer, work station, hand-held computer, and/or any other computing device. The system memory 14 may be read-only memory, random access memory, hard-disk memory, floppy disk memory, external magnetic tape memory, and/or any other device that stores digital information. The display 18 may be a CRT display, flat-panel display, LCD display, television, or any other device that receives and displays pixel information (e.g., RGB data, YUV data, and/or Y, Cr, Cb data).

The video graphics circuit 16 includes a set-up module 20, a texel processing module 22, memory 24, a detail level module 26, a texel coordinate module 28, and a rendering module 30. The set-up module 20 is operable coupled to receive objects parameters 32 from the central processing unit 12. The object parameters 32 include physical coordinates of object elements (e.g., triangles) of images to be rendered on the display. In addition, the object parameters may include texture coordinates, color information, alpha-blending data, and/or any other information to enable the video graphics circuit 16 to render the images on display 18. The set-up module 20 generates a set of derivatives from the object parameters 32, which are processed to obtain texel coordinates and a level of detail. The set-up module 20 processes the following equation to produce the set of derivatives:

$$\delta a/\delta b = w^2 * ((1/w) * (\delta(a/w)/\delta b) - (a/w) * (\delta(1/w)/\delta b))$$

With such an equation, the terms $(1/w)*(\delta(a/w)/\delta b)$ and $(a/w)*(\delta(1/w)/\delta b)$ are linear functions, which can be incrementally adjusted as opposed to being calculated for each pixel from the equations. In addition, note that:

$$(\delta s/\delta x)/w^2 = (1/w)*(\delta(s/w)/\delta x) - (s/w)*(\delta(1/w)/\delta x); \text{ thus}$$

$$\delta(((\delta s/\delta x)/w^2)/\delta x) = (\delta(1/w)/\delta x)*(\delta(s/w)\delta/x) - (\delta(s/w)/\delta x)*(\delta(1/w)/\delta x) = 0.$$

The same is also true for the other three increments (e.g., gradients). Thus, $$\delta(((\delta s/\delta x)/w^2)/\delta x) = \delta(((\delta s/\delta y)/w^2)/\delta y) = \delta(((\delta t/\delta x)/w^2)/\delta x) = \delta(((\delta t/\delta y)/w^2)/\delta y) = 0.$$

As such, only two of these terms need to be updated when rendering an object in a particular scan line: $(\delta s/\delta y)/w^2$ and $(\delta t/\delta y)/w^2$. Further only two of these terms need to be changed when the scan line changes: $(\delta s/\delta x)/w^2$ and $(\delta t/\delta x)/w^2$. As one of average skill in the art will appreciate, if the scanning is done in the Y direction, the terms expressed previously would be the opposite.

Further note that:

$$\delta(((\delta s/\delta x)/w^2)/\delta y) = (\delta(s/w)/\delta x)*(\delta(1/w)/\delta y) - (\delta(1/w)/\delta x)*(\delta(s/w)/\delta y); \text{ and}$$

$$\delta(((\delta s/\delta y)/w^2)\delta x) = (\delta(s/w)/\delta y)*(\delta(1/w)/\delta x) - (\delta(1/w)/\delta y)*(\delta(s/w)/\delta x) =$$

$$-\delta(((\delta s/\delta x)/w^2)/\delta y).$$

Similarly, $$\delta(((\delta t/\delta y)/w^2)/\delta x) = -\delta(((\delta t/\delta x)/w^2)/\delta y).$$

As such, only two increment constants need to be maintained, one from each group, for example:

$$\delta(((\delta s/\delta y)/w^2)/\delta x) \text{ and } \delta(((\delta t/\delta y)/w^2)/\delta x).$$

Thus when stepping in the increasing X direction:

$$(\delta s/\delta y)/w^2 += \delta(((\delta s/\delta y)/w^2)/\delta x), (\delta t/\delta y)/w^2 += \delta(((\delta t/\delta y)/w^2)/\delta x).$$

When stepping in the decreasing X direction:

$$(\delta s/\delta y)/w^2 -= \delta(((\delta s/\delta y)/w^2)/\delta x), (\delta t/\delta y)/w^2 -= \delta(((\delta t/\delta y)/w^2)/\delta x).$$

Further, when stepping in the increasing Y direction:

$$(\delta s/\delta x)/w^2 -= \delta(((\delta s/\delta y)/w^2)/\delta x), (\delta t/\delta x)/w^2 -= \delta(((\delta t/\delta y)/w^2)/\delta x).$$

Still further note that:
$A = (1/w^2)*(\delta s/\delta y)$;
$B = (1/w^2)*(\delta s/\delta x)$;
$C = (1/w^2)*(\delta t/\delta y)$;
$D = (1/w^2)*(\delta t/\delta x)$;

Having established the set of derivatives, the setup module 20 provides the initial values for the linear components 36 and the constants 34 [e.g., $\delta(s/w)/\delta x$, $\delta(s/w)/\delta y$, $\delta(t/w)/\delta x$, $\delta(t/w)/\delta y$, $\delta(1/w)/\delta x$, $\delta(1/w)/\delta y$, $\delta A/\delta x$, and $\delta C/\delta x$,] of the above-mentioned equations to texel coordinate module 28 and to the detail level module 26. In particular, the components 36 s/w, t/w, and 1/w are provided to the texel coordinate module 28 and components 36 A, B, C, and D are provided to the detail level module 26. Based on the received components 36, the texel coordinate module 28, produces the non-linear component 38 (e.g., $w^2$) of the equation. The non-linear component 38 is provided to the detail level module 26, which converts it into a logarithmic function. Such a conversion will be discussed in greater detail with reference to FIG. 2.

The detail level module 26 receives the linear components 36, the non-linear component 38, and the above mentioned constants and produces therefrom, the level of detail 40. Note that the gradients, or incrementing values correspond to $\delta A/\delta x$, $\delta B/\delta y$, $\delta C/\delta x$ and $\delta D/\delta y$. Further note that a subset of the gradients may be supplied and the remaining gradients derived therefrom. Still further note that the constants 34 apply to the object element (i.e., at the object element level) while the linear components 36 apply to pixels of the object element (i.e., at the pixel level). The detail level module 26 will be discussed in greater detail with reference to FIG. 2.

The texture processing module 22 is operably coupled to receive the texel coordinates 37 and the level of detail 40. The texture processing module 22 utilizes these inputs to retrieve a set of texels 42 from memory 24, which stores a plurality of related texture maps, (e.g., MIP maps). The texture processing module 22 may retrieve a set of texels from a single MIP map or from multiple MIP maps. When retrieving from a single MIP map, the texture processing module 22 performs bilinear filtering on the set of texels to obtain a desired texel. If the texture processing module 22 retrieves the set of texels 42 from multiple MIP maps, it performs trilinear filtering to obtain the desired texel.

The texture processing module 22 determines which texture map(s) to address based on the integer portion of the level of detail 40 and determines whether it will perform trilinear filtering or bilinear filtering based on the fractional portion of the level of detail 40. In general, when the fractional portion is within a range of values, trilinear filtering will be done and when the fractional portion is outside of the range of values, bilinear filtering will be done. For example, the range of values may be from 0.3 to 0.7 or any range to achieve a desired result. If bilinear filtering is to be performed, the texture processing module 22 utilizes the integer portion of the level of detail 40 to address one texture map (e.g., MIP map). If, however, trilinear filtering is to be performed, the texture processing module uses the integer portion to address two texture maps. For example, if the level of detail 40 is a value of 1.6, the texture processing module 22 accesses the texture maps having the addresses of 1 and 2. As one of average skill in the art will appreciate, the texture processing module 22 may be configured to exclusively perform bilinear or trilinear filter, and/or to selectively enable switching between the fixed filtering (i.e., bilinear or trilinear) and dynamic filtering (i.e., the above described process).

Upon retrieving the set of texels 42, the texel processing module 22 generates a texel value for a given pixel and provides it to the rendering module 30. The rendering module 30 further receives pixel data 44 (which includes color information, alpha blending parameters, z value, etc.) and produces therefrom display data 46. The display data 46 is routed to the display 18 for presentation thereon. By allowing the texture processing module 22 to dynamically determine bilinear filtering or trilinear filtering, the quality of texel processing is enhanced. As such, the present invention eliminates the restriction of exclusive bilinear filtering or trilinear filtering.

Figure 2:
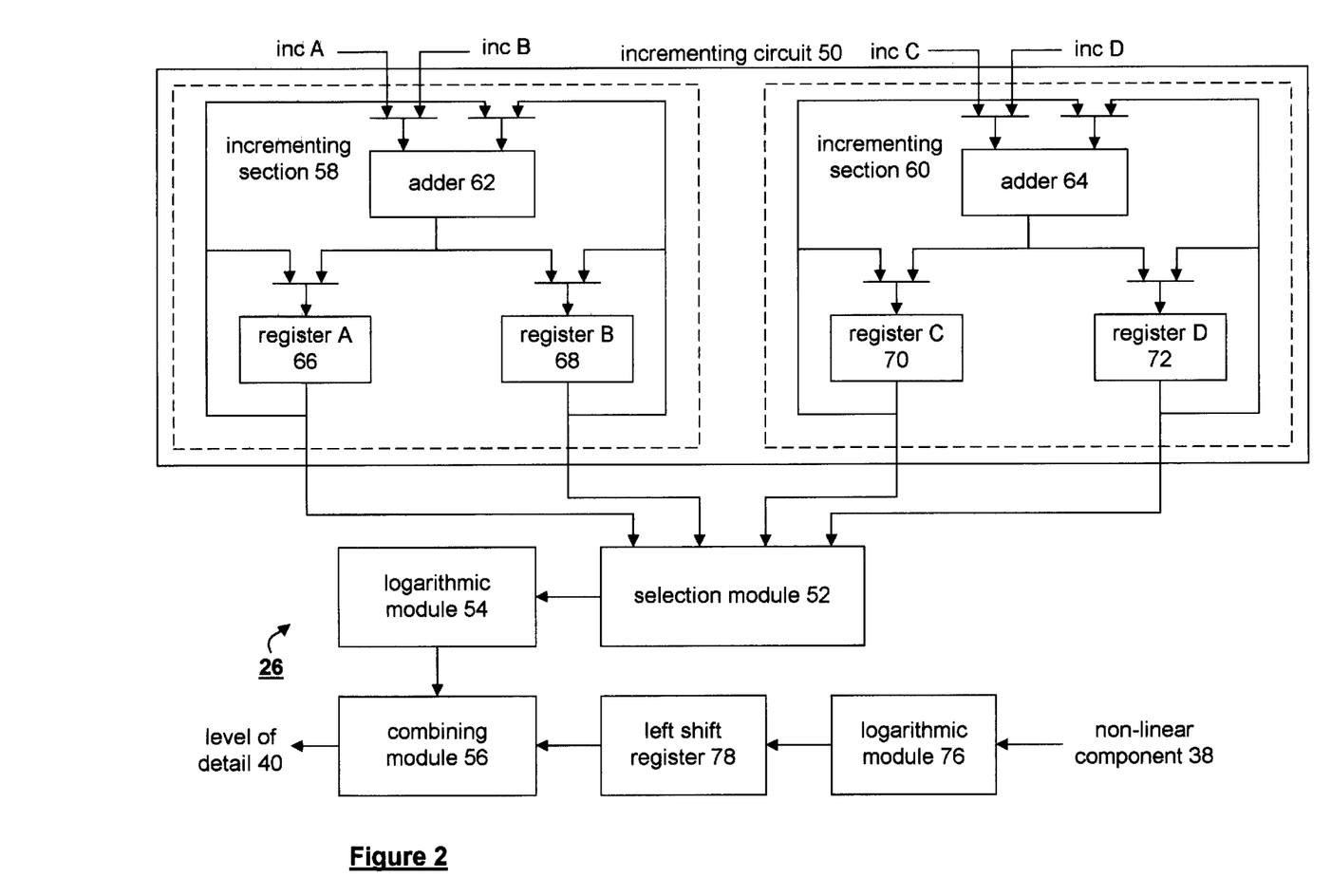
FIG. 2 illustrates a schematic block diagram of the detail level module of FIG. 1.

FIG. 2 illustrates a schematic block diagram of the detail level module 26. The detail level module 28 includes a logarithmic module 76 and a left-shift register 78 for processing the non-linear component 38. The logarithmic module 76 is operably coupled to receive the non-linear component 38 (e.g., represented as 1/w) and to perform logarithmic function thereon to obtain $\log_2(1/w)$. The logarithmic non-linear value is then provided to the left-shift register 78 to perform a multiple by 2 function thereby producing the $\log_2(W^2)$.

The detail level module 26 further includes an incrementing circuit 50, a selection module 52, a logarithmic module 54, and a combining module 56. The incrementing circuit 50 includes a first incrementing section 58 and a second incrementing section 60. Each of the incrementing sections 58 and 60 include an adder 62, 64 and a pair of registers 66 and 68, 70 and 72. When scanning in the same scan of an object element, register A 66 (which stores the linear component $(1/w^2)*(\delta s/\delta y)$) and register C 70 (which stores the linear component $(1/w^2)*(\delta t/\delta y)$) are updated based on the incrementing values (inc. A and inc. C, respectively). Note that inc. A corresponds to the gradient $\delta A/\delta x$ and inc. C corresponds to the gradient $\delta C/\delta x$. When the scanning switches to a new scan line, register B 68 (which stores the linear component $(1/w^2)*(\delta s/\delta x)$) and register D 72 (which stores the linear component $(1/w^2)*(\delta t/\delta x)$) are updated based on the incrementing values (inc. B and inc. D, respectively). Note that inc. B corresponds to the gradient $\delta B/\delta y$ and inc. D corresponds to the gradient $\delta D/\delta y$.

Further note that $\delta B/\delta y=-\delta A/\delta x$ and $\delta D/\delta y=-\delta C/\delta$.

In operation, when scanning within the same scan line, adder 62 is operably coupled to receive the increment A value and the output of register A 66. The adder 62 adds these values and stores the updated value in register A. Similarly, adder 64 is operably coupled to receive the increment C value and the output of register 70. The updated output is stored in register 70. As long as the rendering of the object-element remains on the same scan line, registers A and C are coupled to their respective adders and the corresponding linear components are updated. When the rendering of the object switches scan lines, the adders 62, 64 are operably coupled to receive the increment B value and increment D value. Alternatively, due to the relationship between increment A and B and the relationship between increment C and D, the adders 62, 64 may receive negative increment A and negative increment C, respectively. The adders are also coupled to receive the outputs of register B and D such that the B and D linear components are updated.

As the object element is being rendered, at least two of the registers 66–72 are being updated. The selection module 52 is operably coupled to each of the registers 66–72 and, on a pixel by pixel basis, retrieves the values (i.e., magnitudes of the linear components of the set of derivatives) stored in the registers 66–72. The selection module 52 then selects the largest value from the registers for a given pixel. The selected value (e.g., magnitude) is then provided to the logarithmic module 54 and converted to a logarithmic value based on a logarithmic scale. The resulting logarithmic value is subsequently provided to the combining module 56, which combines the logarithmic value of the linear portion with the logarithmic value of the non-linear portion to produce the level of detail 40. Note that the logarithmic module 54 and logarithmic module 76 may be the same module. Further note that the logarithmic modules 54 and 76 may be implemented as a look-up table such that the inputs are used to address a particular memory location that stores a corresponding logarithmic value. Still further note that the combining module 56 performs a summation such that the resulting level of detail equals the $\log_2(\delta a/\delta b)$. As such the level of detail 40 may be obtained without performing a multiplication function and without performing non-linear functions. Thus, by separating the linear function and the non-linear function, the level of detail may be readily obtained as described with reference to FIGS. 1 and 2.

Figure 3:
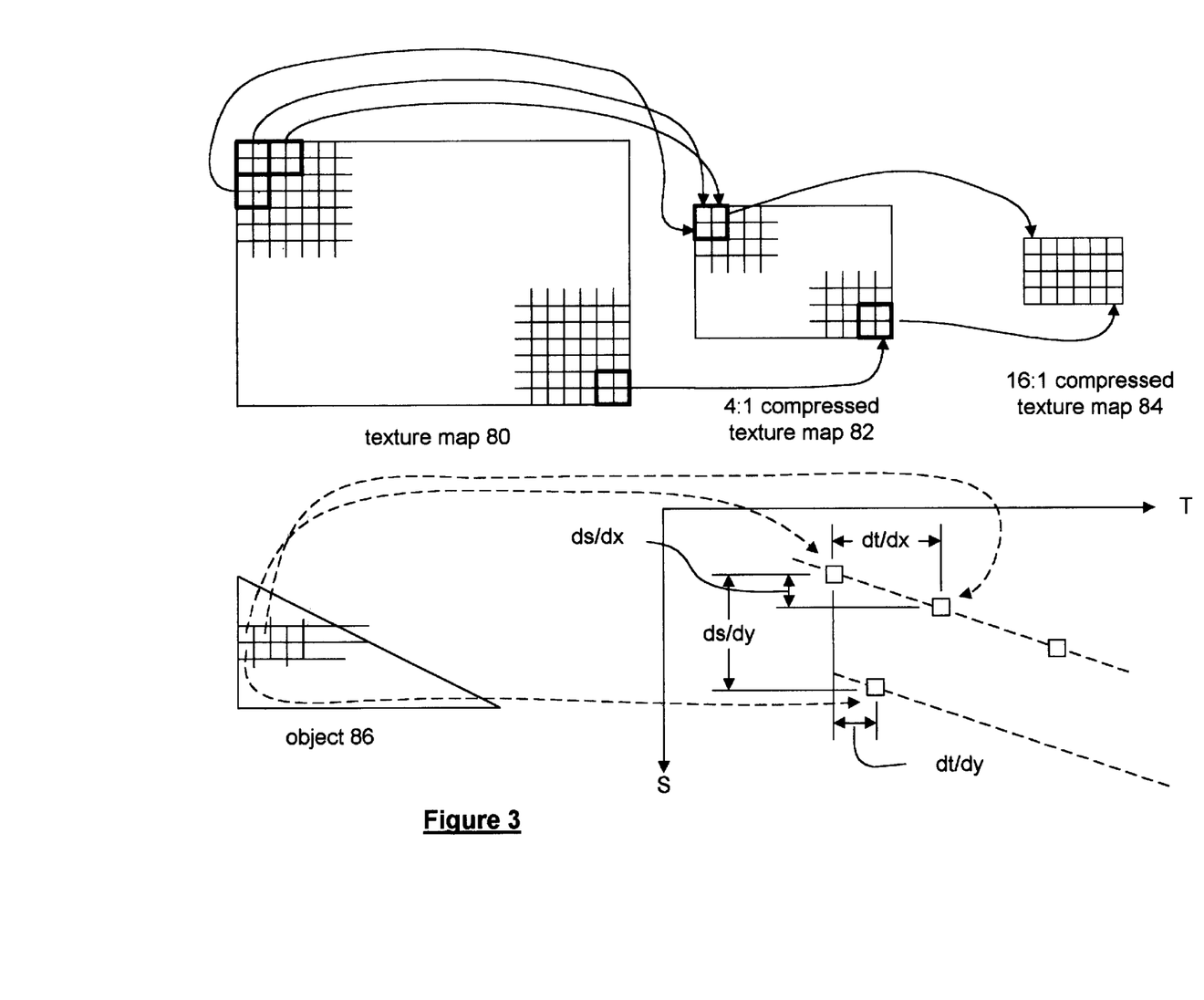
FIG. 3 illustrates a graphical representation of texture filtering in accordance with the present invention.

FIG. 3 illustrates a graphical representation of a plurality of texture maps 80, 82, 84, and the set of derivatives. The plurality of texture maps 80 through 84 include an uncompressed texture map, a four-to-one compressed texture map, a sixteen-to-one compression texture map and a plurality of other texture maps (not shown) such that the last texture includes a single texel. As shown, the uncompressed texture map 80 has four texels that are combined to produce a single texel in the four-to-one compressed texture map 82. Similarly, four texels in the texture map 82 are compressed to a single texel for the compressed texture map 84. Such compression continues until the resulting texture map contains a single texel.

The bottom portion of FIG. 3 illustrates the graphical representation of the physical coordinates of an object 86 and the corresponding texture coordinates of a texture map. It also depicts the set of derivatives, which relate changes in the physical coordinates of the object with changes in texture coordinates. As shown, the first pixel is mapped into a first location in the S-T plane of the texture map. The next horizontal pixel is mapped to another location in the S-T texture map. The distance in the T direction between these two values is shown as the derivative $\delta t/\delta x$. The distance in the S direction is shown as the derivative $\delta s/\delta x$. When the scan line shifts to the next lower line in the Y direction, the pixel is mapped to the S-T coordinates as shown. The difference between the two pixels when mapped to the S-T coordinates system is shown as $\delta t/\delta y$ and $\delta s/\delta y$. From these values, the level of detail 40 can be obtained as described with reference to FIGS. 1 and 2 and as will be described with reference to FIGS. 4 through 7.

Figure 4:
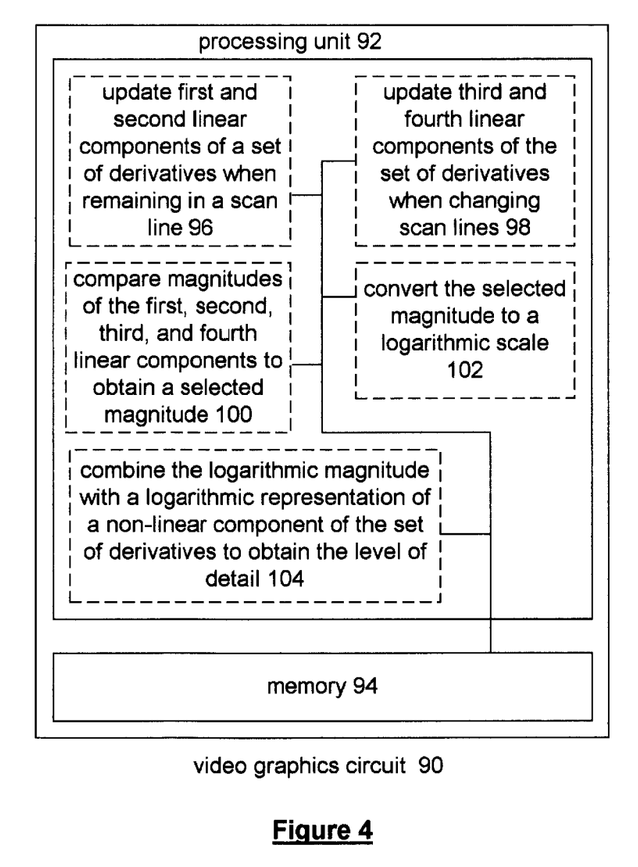
FIG. 4 illustrates a schematic block diagram of a video graphics circuit in accordance with the present invention.

FIG. 4 illustrates a schematic block diagram of a video graphics circuit 90 that includes a processing unit 92 and a memory 94. The processing unit 92 may be a central processing unit, micro-controller, micro-computer, digital signal processor, and/or any device that manipulates digital information based on programming instructions. The memory 94 may be read-only memory, random access memory, floppy disk memory, hard disk memory, magnetic tape memory, CD memory, DVD memory, and/or any device that stores digital information.

The memory 94 stores programming instructions, that, when read by the processing unit 92, causes the processing unit to function as a plurality of circuits 96–104. When executing the programming instructions, the processing unit 92 functions as circuit 96 to update first and second linear components of a set of derivatives when remaining in a scan line, where the first and second linear components correspond to $(1/w^2)*(\delta s/\delta y)$ and $(1/w^2)*(\delta t/\delta y)$, respectively. The processing unit then functions as circuit 98 to update third and fourth linear components of the set of derivatives when changing scan lines, where the third and fourth linear components correspond to $(1/w^2)*(\delta s/\delta x)$ and $(1/w^2)*(\delta t/\delta x)$, respectively.

The processing unit then functions as circuit 100 to compare magnitudes of the first, second, third and fourth linear components to obtain a selected magnitude. The processing unit then functions as circuit 102 to convert the selected magnitude to a logarithmic scale. The processing unit then functions as circuit 104 to combine the logarithmic magnitude with a logarithmic representation of a non-linear component of the set of derivatives to obtain the level of detail. The programming instructions stored in memory 94 and the execution thereof by the processing unit 92 will be discussed in greater detail with reference to FIG. 5.

Figure 5:
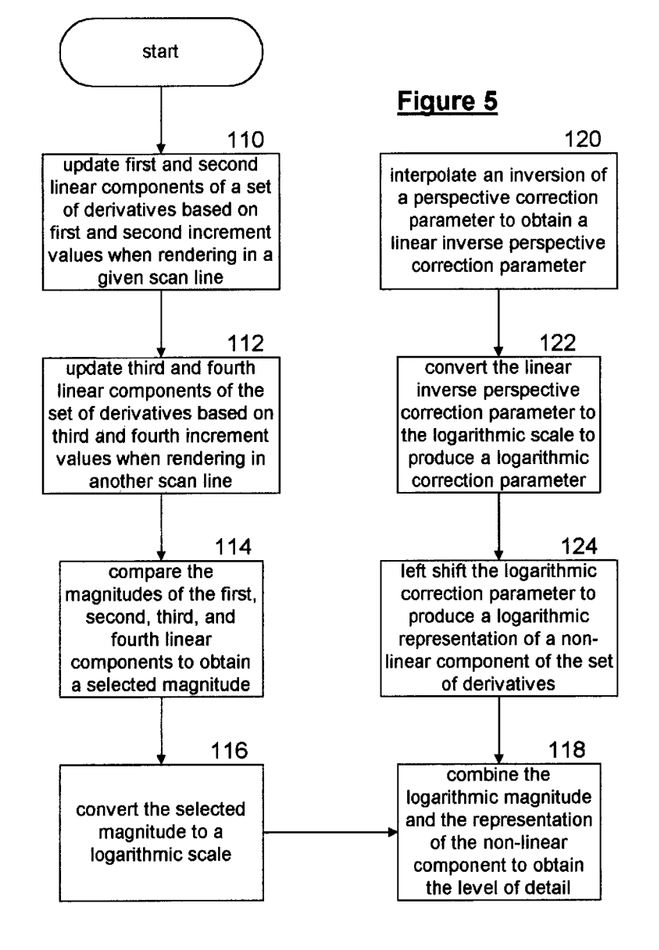
FIG. 5 illustrates a logic diagram of a method for determining the level of detail in accordance with the present invention.

FIG. 5 illustrates a logic diagram of a method for determining the level of detail utilizing non-linear functions and non-multiplication functions. The process begins at step 110 where the first and second linear components of a set of derivatives are updated based on first and second increment values when rendering a pixel in a given scan line. The first and second increments correspond to the gradient $\delta A/\delta x$ and $\delta C/\delta x$. Prior to updating the first and second linear components, an initial first, second, third and fourth linear components are determined based on initialization data (e.g., object parameters) for an initial pixel of the object being rendered. Note that the initialization data comprises a set of constants derived from the physical coordinates, the texture coordinates and a perspective collection parameter (i.e., w) of the object, wherein the set of constants include the first, second, third and fourth increment values. Further note that a subset of the gradients (e.g., constants) may be supplied and the remaining gradients derived therefrom.

The process then proceeds to step 112 where a third and fourth linear components of the set of derivatives are updated based on third and fourth increment values when rendering the object in another scan line. As such when the rendering of the object-element switches from one scan line to the next, the third and fourth linear components are updated. As can be seen at steps 110 and 112 only two linear components are updated for each pixel rendering. The process then proceeds to step 114 where the magnitudes of the first, second, third and fourth linear components are compared t o obtain a selected magnitude. Typically, the largest magnitude will be selected, however, another criteria may be used to select the selected magnitude, such as rate of change, average magnitude, area bounded by the derivatives on the texture maps, etc.

The process then proceeds to step 116 where the selected magnitude is converted to a logarithmic scale to produce a logarithmic magnitude. The conversion to the logarithmic scale may be done by accessing a lookup table that includes a plurality of logarithmic values where each of the logarithmic values are based on a normalized texture map coordinate system.

To compute the non-linear portion of the set of derivatives, the process proceeds to step 120 where an inversion of a perspective collection parameter is interpolated to obtain a linear inverse perspective correction parameter. As such w (the perspective correction parameter) is converted to 1/w. The process then proceeds to step 122 where the linear inverse perspective correction parameter is converted to the logarithmic scale to produce a logarithmic correction parameter. A lookup table, which includes a plurality of logarithmic values, may be accessed to achieve the logarithmic conversion.

The process then proceeds to step 124 where the logarithmic correction parameter is left-shifted to produce a logarithmic representation of a non-linear component of the set of derivatives. Having done this, the process proceeds to step 118 where the logarithmic magnitude, as produced at step 116, is combined with the representation of the non-linear component to obtain the level of detail. Such a combination may be done by performing a subtraction of the logarithmic representation of the non-linear component from the logarithmic magnitude. Having obtained the level of detail, the texel processing module 22 of FIG. 1 may perform trilinear filtering or bilinear filtering as will be discussed with reference to FIGS. 6 and 7.

Figure 6:
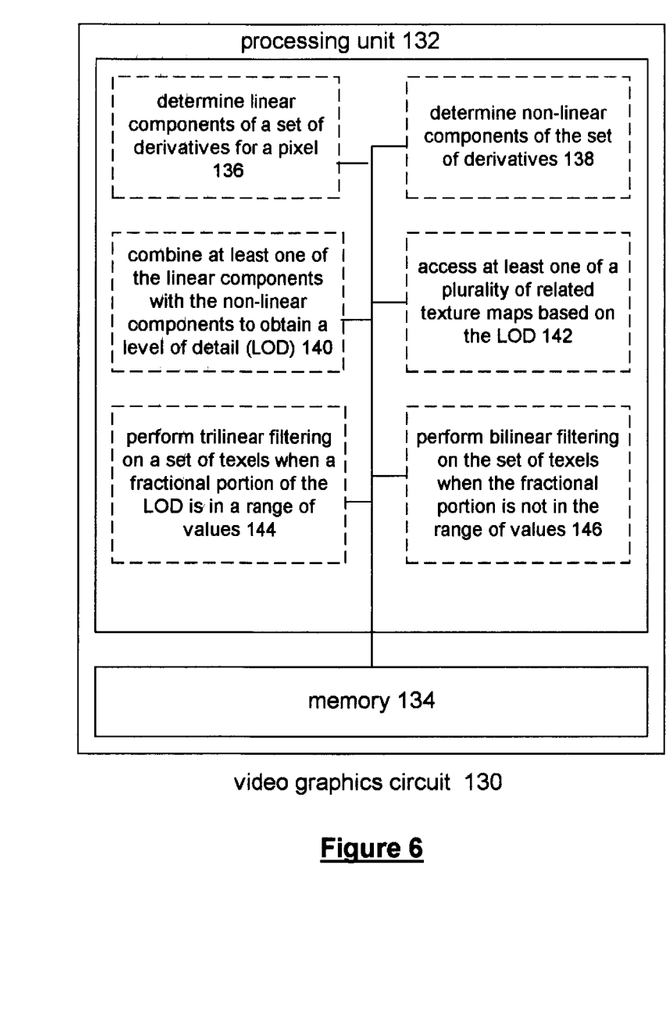
FIG. 6 illustrates a schematic block diagram of an alternate video graphics circuit in accordance with the present invention.

FIG. 6 illustrates a schematic block diagram of a video graphics circuit 130 that includes a processing unit 132 and memory 134. A processing unit 132 may be a central processing unit, a portion thereof, a microcontroller, microprocessor, microcomputer, digital signal processor, a plurality of such devices and/or any device that manipulates digital information based on programming instructions. The memory 132 may be readonly memory, random access memory, floppy disk memory, hard disk memory, external magnetic tape memory, CD memory, DVD memory, and/or any device that stores digital information.

The memory 134 stores programming instructions that, when read by the processing unit 132, causes the processing unit to function as a plurality of circuits 136–146. While reading the programming instructions, the processing unit 132 functions as circuit 136 to determine linear components of a set of derivatives for a pixel. The processing unit then functions as circuit 138 to determine non-linear components of the set of derivatives. Having done this, the processing unit then functions as circuit 140 to combine at least one of the linear components with the non-linear component to obtain a level of detail for a given pixel.

The processing unit then functions as circuit 142 to access at least one of the plurality of related texture maps based on the level of detail. Next the processing unit functions as circuit 144 to perform trilinear filtering on a set of texels retrieved from the at least one texture map when a fractional portion of the level of detail is in a range of values. Alternatively, the processing unit functions as circuit 146 to perform bilinear filtering on the set of texels when the fractional portion is not in the range of values. The programming instructions stored in 134 and the execution thereof by processing unit 132 will be discussed in greater detail with reference to FIG. 7.

Figure 7:
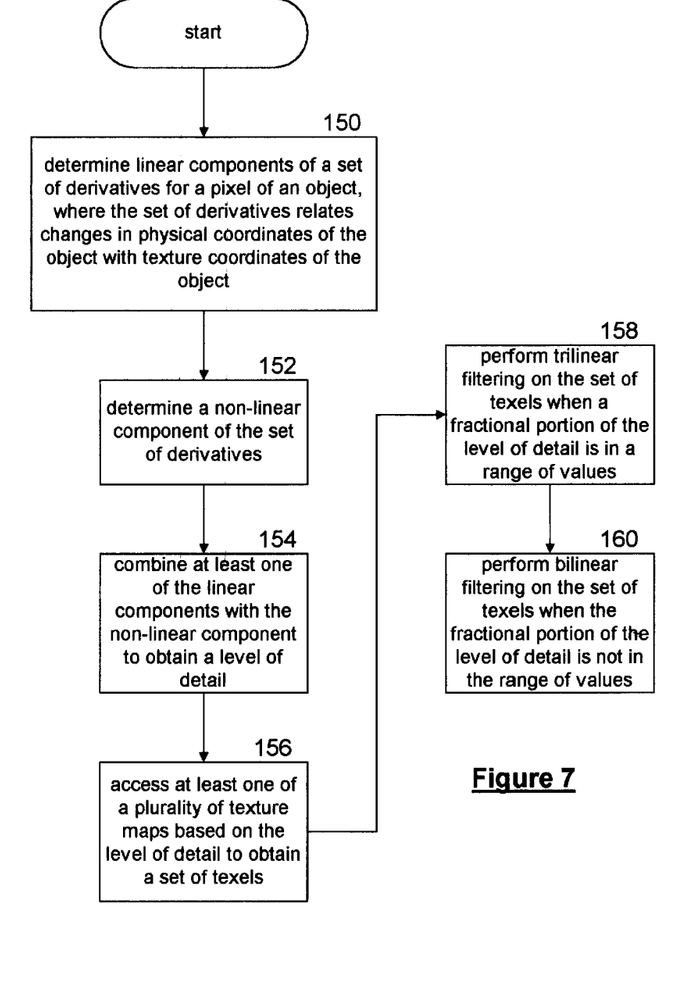
FIG. 7 illustrates a logic diagram of a method for dynamic bi-linear and tri-linear filtering in accordance with the present invention.

FIG. 7 illustrates a logic diagram of a method of dynamically utilizing bilinear and/or trilinear filtering upon a set of texels, The process begins at step 150 where linear components of a set of derivatives are determined for a pixel of an object. The set of derivatives relates changes in physical coordinates of an object with texture coordinates of the object. The process then proceeds to step 152 where a non-linear component of the set of derivatives is determined. The process then proceeds to step 154 where at least one of the linear components is combined with the non-linear component to obtain a level of detail.

The process proceeds to step 156 where at least one of the plurality of texture maps is accessed based on the level of detail to obtain a set of texels. The process then proceeds to step 158 where trilinear filtering is performed upon the set of texels when a fractional portion of the level of detail is in a range of values. The process alternately proceeds to step 160 where bilinear filtering is performed on the set of texels when the fractional portion of the level of details is not in the range of values. As previously mentioned, bilinear filtering takes the set of texels from a single texture map and filters them to a single texel value. Trilinear filtering takes a set of texels from one texture map and at least one texel from another texel map and filters them to produce a single texel.

The preceding discussion has presented a method and apparatus for determining a level of detail and utilizing the level of detail to dynamically perform bilinear and/or trilinear filtering. The determination of the level of detail is done without having to compute non-linear functions and without having to perform multiplication operations. As such, the level of detail is determined using simple addition and/or subtraction functions. As such, the circuit complexity and corresponding cost for implementation of a level of detail circuit on an integrated circuit is substantially reduced.

What is claimed is:

1. A method for determining level of detail while rendering an object, the method comprises the steps of:
   a) updating first and second linear components of a set of derivatives when rendering a pixel of the object in a given scan line, wherein the first and second linear components are updated in a linear manner based on first and second increment values, respectively, and wherein the set of derivatives relates changes in physical coordinates of the object with changes in texture coordinates of the object;
   b) updating third and fourth linear components of the set of derivatives when rendering the pixel of the object corresponds to another scan line, wherein the third and fourth linear components are updated in a linear manner based on third and fourth increment values, respectively;
   c) comparing magnitudes of the first, second, third, and fourth linear components to obtain a selected magnitude;
   d) converting the selected magnitude to a logarithmic scale to produce a logarithmic magnitude; and
   e) combining the logarithmic magnitude with a logarithmic representation of a non-linear component of the set of derivatives to obtain the level of detail for the pixel.

2. The method of claim 1 further comprises determining initial first, second, third, and fourth linear components based on initialization data of the object when the pixel is an initial pixel of the object.

3. The method of claim 2, wherein the initialization data further comprises a set of constants derived from the physical coordinates, the texture coordinates, and a perspective correction parameter of the object, wherein the set of constants include the first, second, third, and fourth increment values.

4. The method of claim 1 further comprises determining the logarithmic representation of the non-linear component by:
   interpolating an inversion of a perspective correction parameter to obtain a linear inverse perspective correction parameter;
   converting the linear inverse perspective correction parameter to the logarithmic scale to produce a logarithmic correction parameter; and
   shifting left the logarithmic correction parameter to produce the logarithmic representation of the non-linear component.

5. The method of claim 4, wherein step (e) further comprises subtracting the logarithmic representation of the non-linear component from the logarithmic magnitude.

6. The method of claim 4, wherein the logarithmic conversion further comprises accessing a look up table that includes a plurality of logarithmic values, wherein the plurality of logarithmic values is based on a normalized texture map coordinate system.

7. The method of claim 1, wherein step (d) further comprises accessing a look up table that includes a plurality of logarithmic values, wherein the plurality of logarithmic values are based on a normalized texture map coordinate system.

8. The method of claim 1 further comprises performing trilinear filtering when a fractional portion of the level of detail is in a first range of values.

9. The method of claim 8 further comprises performing bilinear filtering when the fractional portion is not in the first range of values.

10. A method for texel blending, the method comprises the steps of:
    a) determining linear components of a set of derivatives for a pixel of an object, wherein the set of derivatives relates changes in physical coordinates of the object with changes in texture coordinates of the object;
    b) determining a non-linear component of the set of derivatives for the pixel;
    c) combining at least one of the linear components with the non-linear component to obtain a level of detail for the pixel;
    d) accessing at least one of a plurality of related texture maps based on the level of detail to retrieve a set of texels;
    e) performing trilinear filtering on the set of texels when a fractional portion of the level of detail is in a range of values; and
    f) performing bilinear filtering on the set of texels when the fractional portion is not in the range of values.

11. The method of claim 10, wherein step (a) further comprises:
    updating first and second linear components of linear components when rendering the pixel in a given scan line of the object, wherein the first and second linear components are updated in a linear manner based on first and second increment values, respectively; and
    updating third and fourth linear components of the linear components when rendering the pixel of the object corresponds to another scan line, wherein the third and fourth linear components are updated in a linear manner based on third and fourth increment values, respectively.

12. The method of claim 11, wherein step (c) further comprises comparing magnitudes of the first, second, third, and fourth linear components to obtain the at least one of the linear portions.

13. The method of claim 10, wherein step (c) further comprises converting the at least one linear component and the non-linear component to a logarithmic scale prior to the combining.

14. A video graphics circuit comprises:

a set-up module operably coupled to receive object parameters of an object and to produce, therefrom, a set of constants, linear components and a non-linear component of a set of derivatives, wherein the set of derivatives relates changes in physical coordinates of the object to changes in texture coordinates of the object;

memory operably coupled to store a plurality of related texture maps; and detail level module operably coupled to the memory and the set-up module, wherein the detail level module determines a level of detail for each pixel of the object as the object is being rendered, wherein the detail level module includes:

incrementing circuitry operably coupled to increment at least one of linear components when the pixel being rendered is in a given scale line and to increment at least one other one of the linear components when the pixel being rendered is in another scale line;

selecting module operably coupled to the incrementing circuitry, wherein the selecting module selects a magnitude of one of the linear components to produce a selected magnitude;

logarithmic module operably coupled to the selecting module, wherein the logarithmic module converts the selected magnitude to a logarithmic scale to produce a logarithmic magnitude; and combining module operably coupled to combine the logarithmic magnitude with a logarithmic representation of the non-linear component to produce the level of detail.

15. The video graphics circuit of claim 14, wherein the incrementing module further comprises:

a first incrementing section that includes a first adder, a first register, and a second register, wherein the first adder is operably coupled to add a first incrementing value and an output of the first register or to add a second incrementing value and an output of the second register when the pixel is being rendered in the give scale line; and a second incrementing section that includes a second adder, a third register, and a fourth register, wherein the second adder is operably coupled to add a second incrementing value and an output of the third register or to add a fourth incrementing value and an output of the fourth register when the pixel is being rendered in another scale line.

16. The video graphics circuit of claim 14, wherein the selecting module selects the magnitude of the one of the linear components when the one of the linear components has the greatest magnitude.

17. The video graphics circuit of claim 14, wherein the logarithmic module further comprises a look up table that includes a plurality of logarithmic values, wherein the plurality of logarithmic values is based on a normalized texture map coordinate system.

18. The video graphics circuit of claim 14 further comprises a non-linear module operable to produce the non-linear component, wherein the non-linear module includes an incrementing module operable to increment a representation of a perspective correction parameter, a second logarithmic module operably coupled to convert the representation of the perspective correction parameter to the logarithmic scale producing a logarithmic representation, and a left shift register operable to shift the logarithmic representation to produce the logarithmic component.

19. The video graphics circuit of claim 14 further comprises texel processing module operably coupled to receive a set of texels from at least one of the plurality of texture maps, wherein the set of texels is determined based on the level of detail and the texture coordinates.

20. The video graphics circuit of claim 19, wherein the texel processing module filters the set of texels using trilinear filtering when the level of detail is in a range of values and filters the set of texels using bilinear filtering when the level of detail is not in the range of values.

21. A video graphics circuit comprises:

a processing module; and memory operably coupled to the processing module, wherein the memory stores programming instructions that, when read by the processing module, cause the processing module to (a) update first and second linear components of a set of derivatives when rendering a pixel of the object in a given scan line, wherein the first and second linear components are updated in a linear manner based on first and second increment values, respectively, and wherein the set of derivatives relates changes in physical coordinates of the object with changes in texture coordinates of the object; (b) update third and fourth linear components of the set of derivatives when rendering the pixel of the object corresponds to another scan line, wherein the third and fourth linear components are updated in a linear manner based on third and fourth increment values, respectively; (c) compare magnitudes of the first, second, third, and fourth linear components to obtain a selected magnitude; (d) convert the selected magnitude to a logarithmic scale to produce a logarithmic magnitude; and (e) combine the logarithmic magnitude with a logarithmic representation of a non-linear component of the set of derivatives to obtain the level of detail for the pixel.

22. The video graphics circuit of claim 21, wherein the memory further comprises programming instructions that cause the processing unit to determine initial first, second, third, and fourth linear components based on initialization data of the object when the pixel is an initial pixel of the object.

23. The video graphics circuit of claim 21, wherein the memory further comprises programming instructions that cause the processing unit to determine the logarithmic representation of the non-linear component by:

interpolating an inversion of a perspective correction parameter to obtain a linear inverse perspective correction parameter;

converting the linear inverse perspective correction parameter to the logarithmic scale to produce a logarithmic correction parameter; and shifting left the logarithmic correction parameter to produce the logarithmic representation of the non-linear component.

24. The video graphics circuit of claim 21, wherein the memory further comprises programming instructions that cause the processing unit to perform trilinear filtering when a fractional portion of the level of detail is in a first range of values.

25. The video graphics circuit of claim 24, wherein the memory further comprises programming instructions that cause the processing unit to perform bilinear filtering when the fractional portion is not in the first range of values.

26. A video graphics circuit comprises:

a processing module; and memory operably coupled to the processing module, wherein the memory stores programming instructions that, when read by the processing module, cause the processing module to (a) determine linear components of a set of derivatives for a pixel of an object, wherein the set of derivatives relates changes in physical coordinates of the object with changes in texture coordinates of the object; (b) determine a non-linear component of the set of derivatives for the pixel; (c) combine at least one of the linear components with the non-linear component to obtain a level of detail for the pixel; (d) access at least one of a plurality of related texture maps based on the level of detail to retrieve a set of texels; (e) perform trilinear filtering on the set of texels when a fractional portion of the level of detail is in a range of values; and (f) perform bilinear filtering on the set of texels when the fractional portion is not in the range of values.

27. The video graphics circuit of claim 26, wherein the memory further comprises programming instructions that cause the processing unit to:

update first and second linear components of linear components when rendering the pixel in a given scan line of the object, wherein the first and second linear components are updated in a linear manner based on first and second increment values, respectively; and update third and fourth linear components of the linear components when rendering the pixel of the object corresponds to another scan line, wherein the third and fourth linear components are updated in a linear manner based on third and fourth increment values, respectively.

28. The video graphics circuit of claim 27, wherein the memory further comprises programming instructions that cause the processing unit to compare magnitudes of the first, second, third, and fourth linear components to obtain the at least one of the linear portions.

29. The video graphics circuit of claim 26, wherein the memory further comprises programming instructions that cause the processing unit to convert the at least one linear component and the non-linear component to a logarithmic scale prior to the combining.

* * * * *